US012763531B2

(12) United States Patent
Xia et al.

(10) Patent No.: US 12,763,531 B2
(45) Date of Patent: Oct. 13, 2026

(54) COAXIAL CONNECTOR INCLUDING HYBRID FITTING

(71) Applicant: Communications Test Design, Inc., West Chester, PA (US)

(72) Inventors: Hongwei Xia, Changzhou (CN); Eric G. Hall, Malvern, PA (US)

(73) Assignee: Communications Test Desgin, Inc., West Chester, PA (US)

( * ) Notice: Subject to any disclaimer, the term of this patent is extended or adjusted under 35 U.S.C. 154(b) by 327 days.

(21) Appl. No.: 18/663,330

(22) Filed: May 14, 2024

(65) Prior Publication Data

US 2025/0357710 A1 Nov. 20, 2025

(51) Int. Cl.
*H01R 24/40* (2011.01)
*H01R 103/00* (2006.01)

(52) U.S. Cl.
CPC ......... *H01R 24/40* (2013.01); *H01R 2103/00* (2013.01)

(58) Field of Classification Search
CPC ............................ H01R 24/40; H01R 2103/00
USPC ................................ 439/578, 320, 253–257
See application file for complete search history.

(56) References Cited

U.S. PATENT DOCUMENTS 3,206,540 A * 9/1965 Cohen .................. H01R 9/0521 174/75 C
3,869,187 A 3/1975 Bingham
6,808,415 B1 * 10/2004 Montena ............ H01R 13/5205 439/584
7,189,091 B1 3/2007 Montena
7,278,887 B1 10/2007 Palinkas et al.
7,347,726 B2 3/2008 Wlos
7,347,727 B2 * 3/2008 Wlos .................. H01R 13/6277 439/578
7,575,459 B2 * 8/2009 Nickol ................. H01R 13/622 439/372
7,972,158 B2 * 7/2011 Wild .................. H01R 13/6277 439/352
8,079,860 B1 12/2011 Zraik
8,152,551 B2 4/2012 Zraik
8,277,247 B2 * 10/2012 Paynter .................. H01R 4/484 439/578
8,419,468 B2 * 4/2013 Alrutz .................... H01R 24/40 439/321
8,545,263 B2 * 10/2013 Islam ................... H01R 9/0521 439/578
9,166,348 B2 10/2015 Burris et al.
9,570,819 B2 2/2017 Vaccaro
10,651,593 B2 5/2020 Wu et al.
(Continued)

*Primary Examiner* — Gary F Paumen
(74) *Attorney, Agent, or Firm* — Duane Morris LLP

(57) ABSTRACT

A connector for a coaxial cable includes a nut including a sleeve portion including a smooth portion on an inside of the nut and only one longitudinal slot, and a threaded portion; a spring coil around the sleeve portion; and an outer shell around the nut, wherein the sleeve portion is configured to provide an interference fit to a mating connector, when the nut is connected to the mating connector, both the sleeve portion and the threaded portion make electrical and physical contact with the mating connector, the outer shell includes a knurled portion on an outer surface, the sleeve portion includes a circumferential recess and the spring coil is located in the recess, and a rear portion of the nut is configured to connect to the cable connecting portion.

20 Claims, 10 Drawing Sheets

(56) References Cited

U.S. PATENT DOCUMENTS

| | | | | |
|---|---|---|---|---|
| 11,296,435 | B2 | 4/2022 | Watkins et al. | |
| 2012/0129387 | A1* | 5/2012 | Holland ................. | H01R 43/14 439/578 |

* cited by examiner

COAXIAL CONNECTOR INCLUDING HYBRID FITTING

FIELD OF THE DISCLOSURE

The present disclosure relates to a male connector used with a coaxial cable. More particularly the disclosure relates to a hybrid press-on/thread-on coaxial connector interface.

BACKGROUND

Common wiring applications requiring routing of coaxial cable that rely on electrical connectors that have become standardized. For example, a male Type F connector 10 shown in FIG. 1 is a standard used in connecting coaxial cable 19 in home cable, television, and networking applications, among others. It is understood that a Type F connector has 75Ω impedance over a bandwidth up to several GHz. Such a Type F connector is generally connected to a coaxial cable by crimping or screwing the body over the cable shielding braid and includes a captive nut. Other standard coaxial cable connectors (i.e., SMA, Type N, etc.) are similarly constructed.

As shown in FIG. 1, the male Type F connector 10 can include a captive nut as a threaded collar 12 which mates to threads on a female connector or radio frequency (RF) port to establish an interconnection. The threaded collar 12 requires multiple turns to establish the interconnection of the center conductor 191 and outer cable shielding. These threaded fittings can be difficult to align and start on their female threaded portion, can be hard to tighten without tools, and can often bind or be cross-threaded thus, not seating all the way and/or making a poor electrical connection, RF seal, or environmental seal.

In a different arrangement (not shown), a male Type F connector can include spring-loaded fingers that can establish an interconnection when pushed over the female connector. Type F connectors using fingers may not be as reliable as a connector with a threaded collar because the pressed interference fit may cause the connector to not be seated properly and can be subject to loosening by impact and/or vibration. Additionally, spaces between the connector fingers can cause performance degradation due to RF and/or moisture leakage between the fingers. Other standard coaxial connectors such as SMA and Type N can have similar issues.

Therefore, it is an object of the disclosure to provide a connector that overcomes deficiencies of conventional threaded and press-on coaxial cable connectors.

SUMMARY

Disclosed is a male coaxial connector including a hybrid fitting of two industry-type standard fittings. The rear portion of the fitting includes a threaded body that can be tightened by hand turning the fitting clockwise over a female F connector or terminal until snug. The exterior portion includes knurling with a series of peaks and valleys defining a grip that allows a user to tighten the connector and cable to an adequate torque without over-tightening, using only their fingers. The front portion of the fitting includes a “C” shaped protrusion from the threaded connector that allows the connector to be pushed onto the female mate without any threading. This “C” shaped section is held closed by a retaining ring at the end, which also ensures a snug fit. Thus, a user can press fit the connector with the hybrid fitting onto a female connector to begin connection and to align the connectors and then complete the connection by turning the fitting clockwise until snug to complete the connection. This provides for a male coaxial connector with a tight connection and RF shielding that is easily aligned and tightened with no tools.

The disclosed connector uses a single body configuration with one protrusion which is a portion of the threaded body that mitigates binding and cross-threading while providing a better price/performance option than conventional designs.

To overcome the problems described above, an embodiment of the present disclosure includes a connector for a coaxial cable including a nut including a sleeve portion and a threaded portion; and a spring coil around the sleeve portion.

The connector can further include a cable connecting portion configured to connect the connector to the coaxial cable.

In an aspect, a rear portion of the nut is configured to connect to the cable connecting portion.

The connector can further include an outer shell around the nut.

In an aspect, the sleeve portion is a front end of the nut.

In an aspect, the sleeve portion includes only one longitudinal slot.

In an aspect, the sleeve portion includes a smooth portion on an inside of the nut.

In an aspect, the sleeve portion is configured to provide an interference fit to a mating connector.

In an aspect, when the nut is connected to a mating connector, both the sleeve portion and the threaded portion make electrical and physical contact with the mating connector.

In an aspect, the outer shell includes a knurled portion on an outer surface.

In an aspect, the sleeve portion includes a circumferential recess and the spring coil is located in the recess.

In an aspect, the threaded portion includes threads configured to engage threads of a mating connector.

In an aspect, the connector is an F-type connector.

In another embodiment, a connector for a coaxial cable comprising a nut including a sleeve portion and a threaded portion, wherein the sleeve portion includes only one longitudinal slot.

In an aspect, the sleeve portion includes a recess around a circumference and a spring coil is located in the recess.

The above and other features, elements, characteristics, steps, and advantages of the present invention will become more apparent from the following detailed description of preferred embodiments of the present invention with reference to the attached drawings.

DETAILED DESCRIPTION

Figure 1:
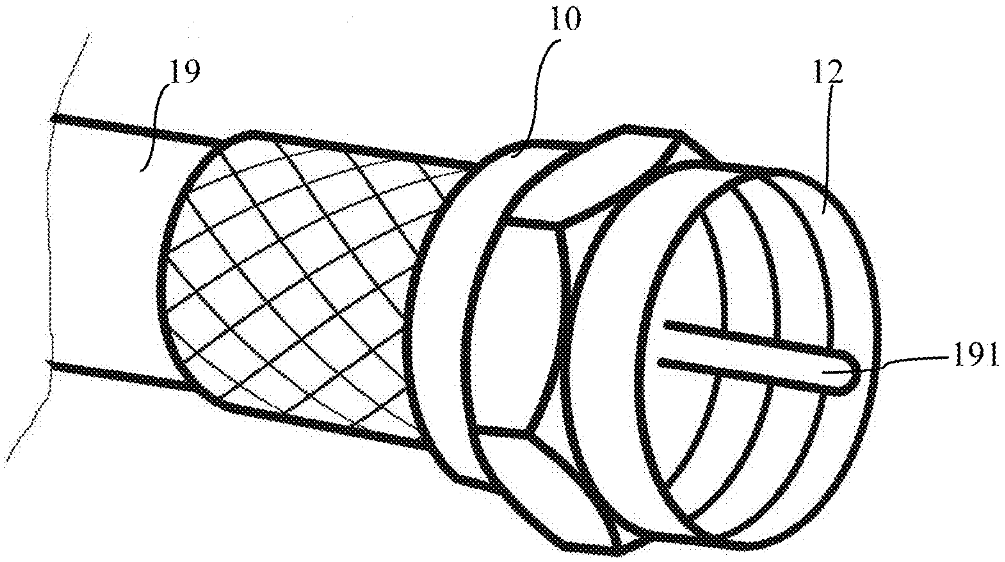
RELATED ART FIG. 1
FIG. 1 is a perspective view of a connector according to the related art.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Directional terms as used herein—for example up, down, right, left, front, back, top, bottom, vertical, horizontal—are made only with reference to the figures as drawn and are not intended to imply absolute orientation.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Figure 2:
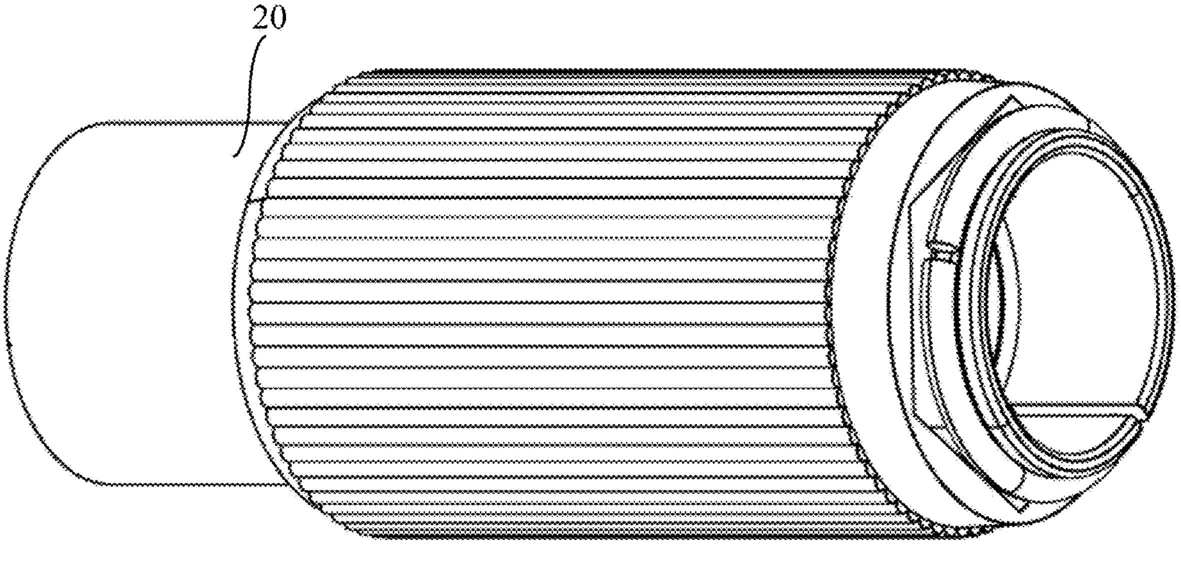
FIG. 2 to FIG. 4 are perspective views of a connector according to an embodiment of the present disclosure.
Figure 3:
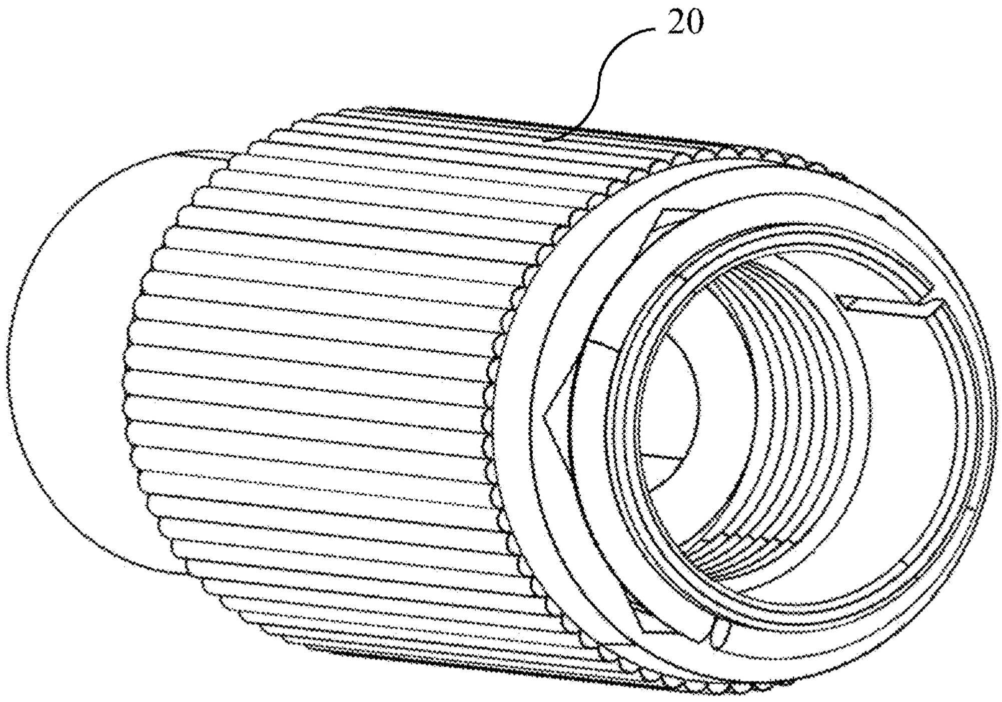
Figure 4:
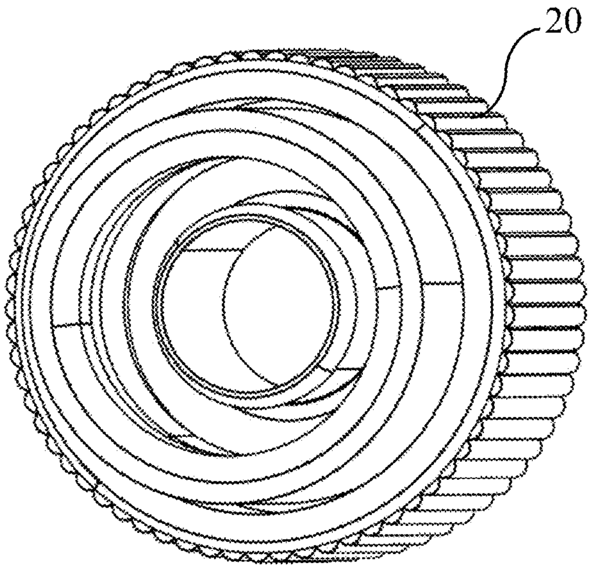
Figure 5A:
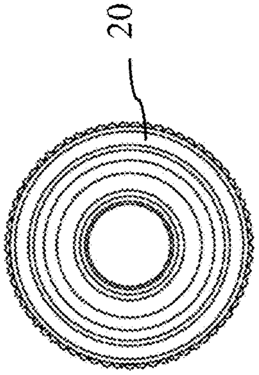
FIG. 5A is a rear view.
Figure 5B:
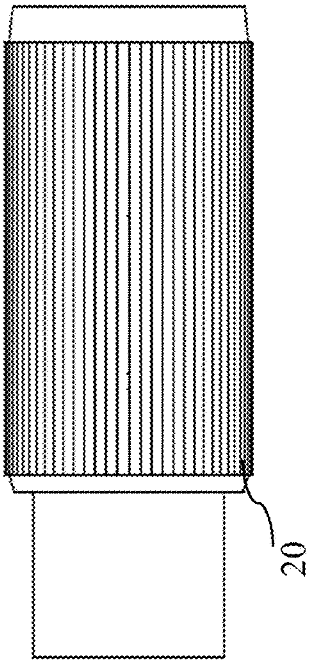
FIG. 5B is a side view.
Figure 5C:
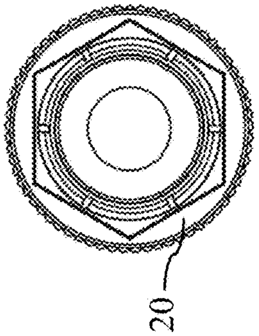
FIG. 5C is a front rear of the connector.

FIG. 2 is a perspective view of a male connector 20 according to an embodiment of the present disclosure. FIG. 3 is a front perspective view of the connector 20. FIG. 4 is a rear perspective view of the connector 20. FIG. 5A is a rear view, FIG. 5B is a side view, and FIG. 5C is a front rear of the connector 20. It should be appreciated that the connector 20 can be a RF connector used to mate coaxial cable. For example, the connector 20 can be a male Type F connector configured to fit with a coaxial cable and connect to a mating female connector. One skilled in the art will appreciate that the configuration of the male connector 20 is similarly applicable to Type N connectors and or other standard or proprietary connector configurations having an end bore which allows an outer diameter surface of a mating female connector to be contacted to an inner surface of the male connector.

Figure 6:
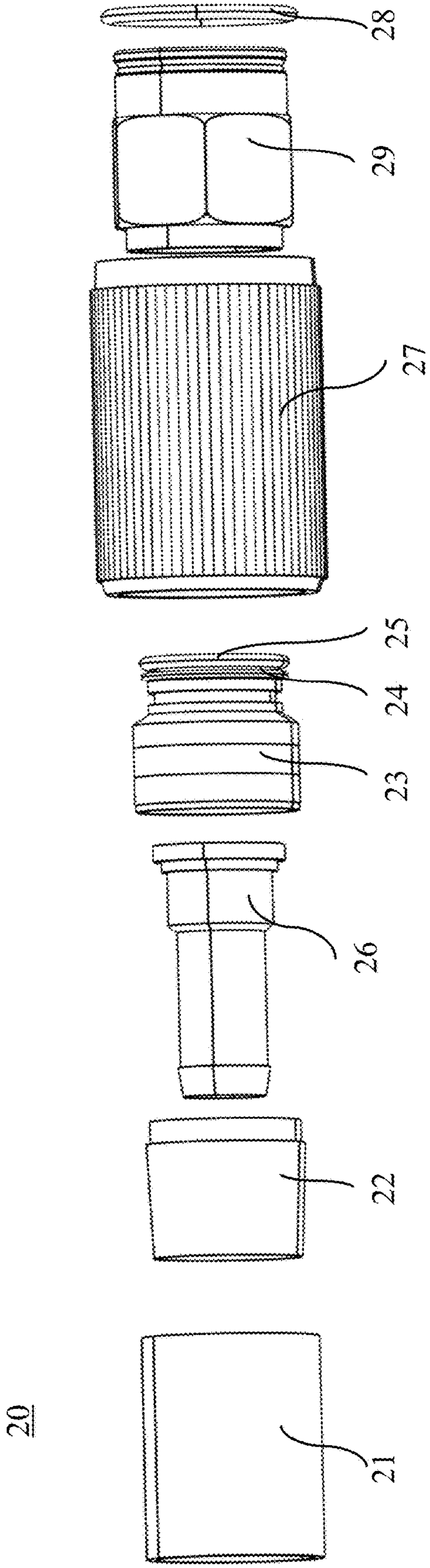
FIG. 6 is an exploded view of the connector.
Figure 7:
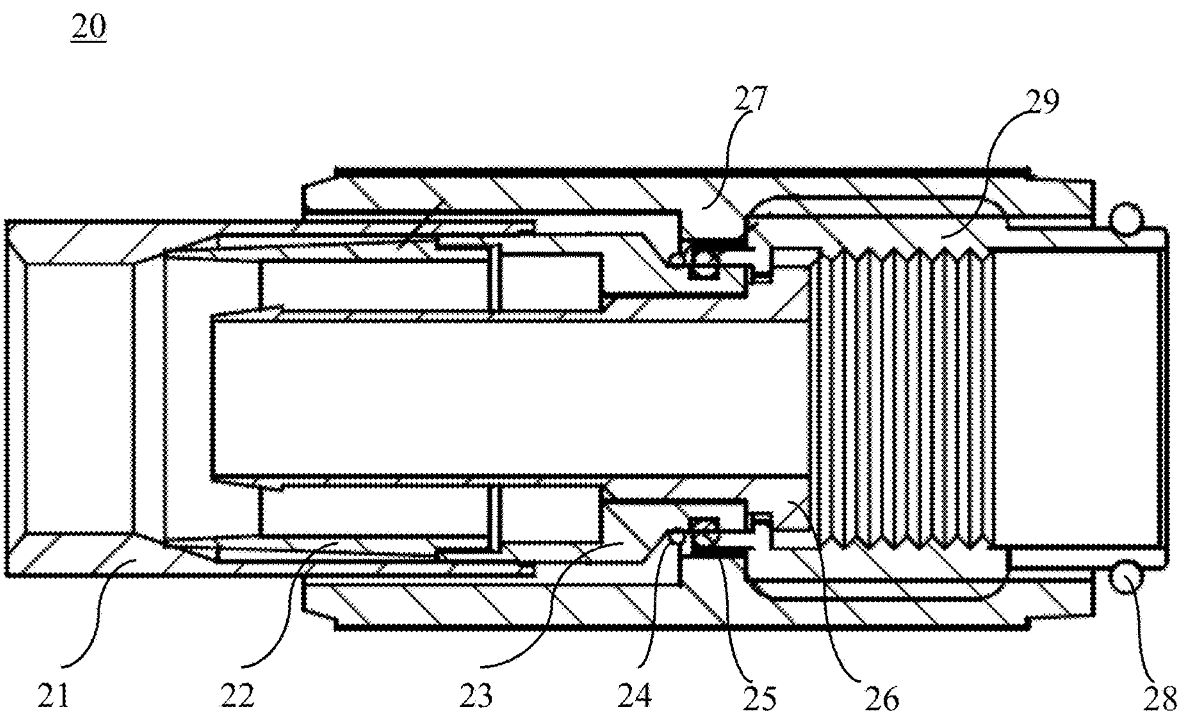
FIG. 7 is a cross section view of the connector.

FIG. 6 is an exploded view of the connector 20. FIG. 6 shows that the connector 20 can include several components that fit together to define the connector 20 and attached the connector 20 to a coaxial cable. For example, the connector 20 can include a tail copper tube 21, a locking shell 22, an intermediate connection 23, an inner spring coil 24, a rubber ring 25, an in-connection 26, an outer shell 27, and outer spring coil 28, and a nut 29. FIG. 7 is a side cross-section view of the connector 20 that shows the components assembled.

Figure 8:
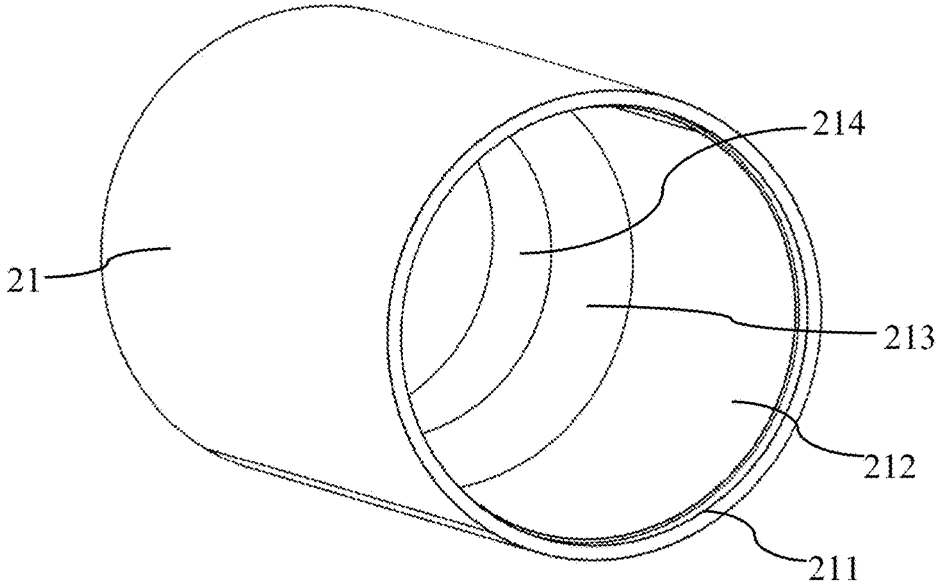
FIG. 8 is a perspective view of a tail copper tube.

FIG. 8 is a perspective view of the tail copper tube 21. The tail copper tube 21 is cylindrical and can have a uniform outer diameter. Internal features can include a recessed step 211, a first portion 212 having a first inner diameter, a tapered portion 213 in which the inner diameter transitions to a second portion 214 having a second inner diameter that is less than the first inner diameter. The tail cooper tube 21 can be made from copper, brass, or any suitable metal or alloy and have a finish of nickel, chrome, or any other suitable material.

Figure 9:
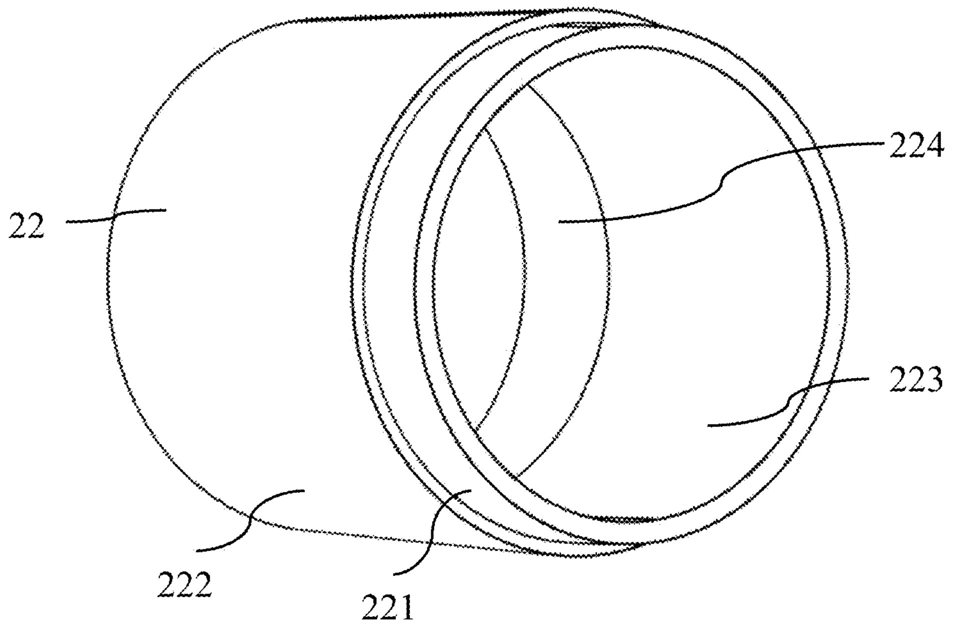
FIG. 9 is a perspective view of a locking shell.

FIG. 9 is a perspective view of the locking shell 22. The locking shell 22 is cylindrical and can have a stepped outer diameter. That is, the locking shell 22 can include a first outer portion 221 having an outer diameter less than an outer diameter of a second outer portion 222. Internal features can include a first internal portion 223 having a first inner diameter and a tapered portion 224 in which the inner diameter transitions to an end of the locking shell 22 having a second inner diameter that is greater than the first inner diameter. The tail cooper tube 21 can be made from polyoxymethylene (POM), nylon, or any suitable plastic or material.

Figure 10:
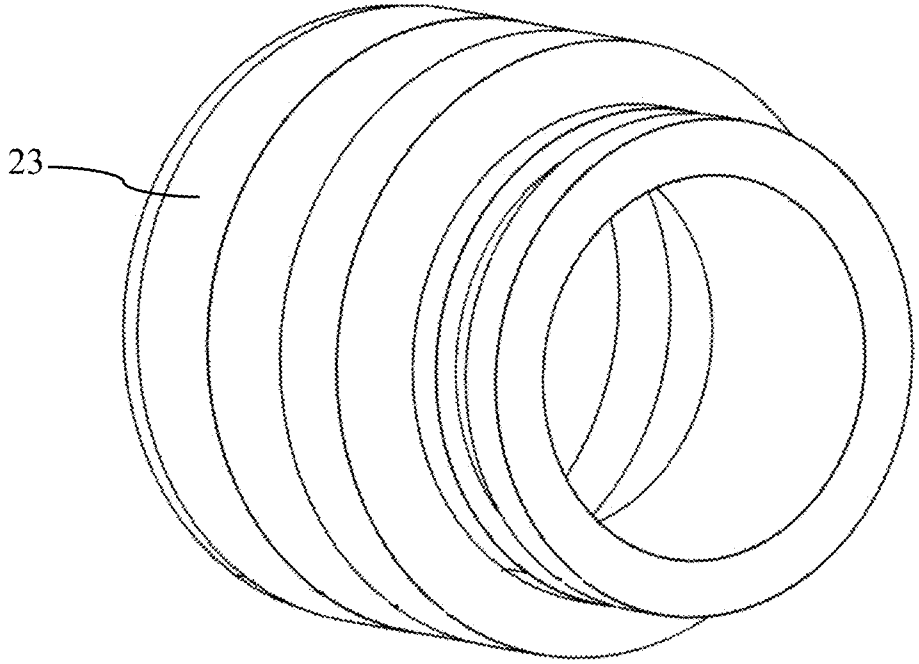
FIG. 10 is a perspective view of an intermediate connection.
Figure 11:
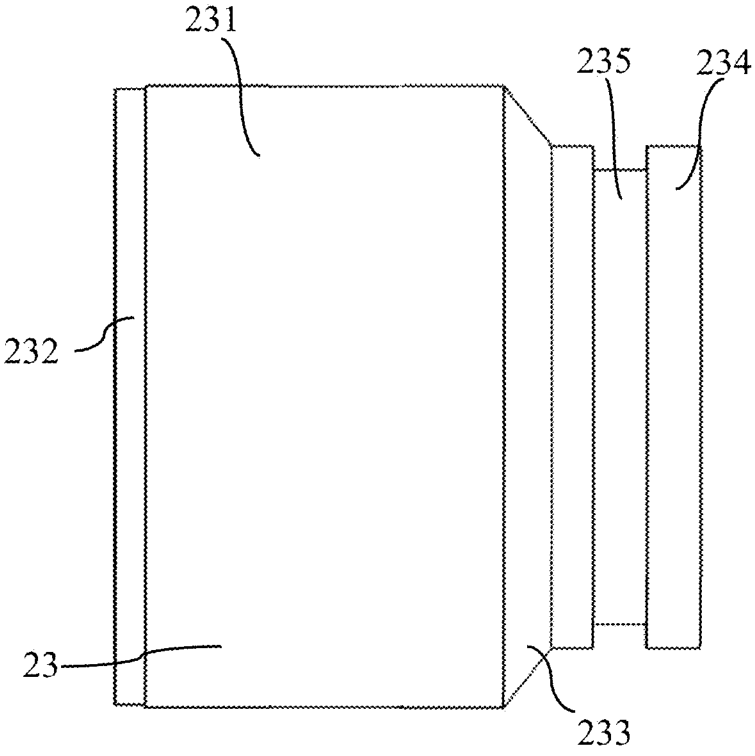
FIG. 11 is a side view of the intermediate connection.
Figure 12:
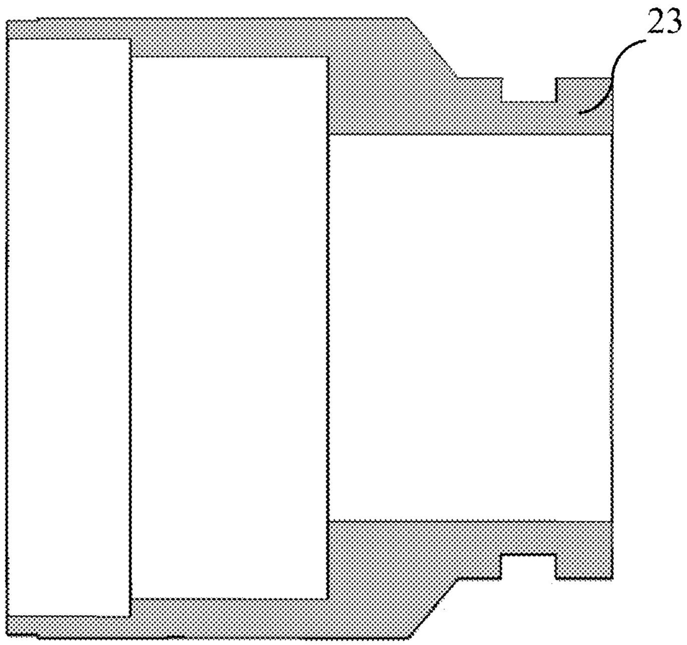
FIG. 12 is a side cross-section view of the intermediate connection.

FIG. 10 is a perspective view, FIG. 11 is a side view, and FIG. 12 is a side cross-section view of the intermediate connection 23. As shown, the intermediate connection 23 can be substantially rounded. Also, as shown in FIG. 11, the intermediate connection 23 can include several portions with different outer diameters. A first portion 231 can have the greatest outer diameter. A second portion 232 can be included at one end of the intermediate connection 23 and have a diameter stepped down and less than the first portion 231. The intermediate connection 23 can include a tapered portion 233 where the outer diameter decreases away from the first portion 231 to a diameter of a third portion 234. The third portion 234 can include a recessed groove 235 with a lesser diameter of the third portion 234 in which the rubber ring 25 can be located. FIG. 12 shows that the intermediate connection 23 can have several internal portions with different internal diameters. The width and internal diameters of the internal portions can be configured to match with other components of the connector 20 as shown in FIG. 7. The intermediate connection 23 can be made from copper, brass, or any suitable metal or alloy and have a finish of nickel, chrome, or any other suitable material.

Figure 13:
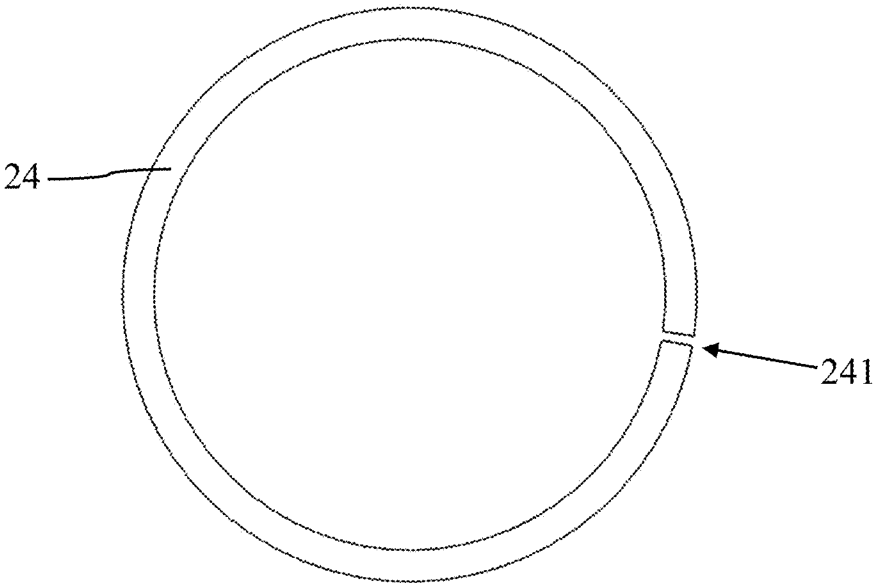
FIG. 13 is a view of an inner spring coil.

FIG. 13 is a view of the inner spring coil 24. The inner spring coil 24 can be rounded with a uniform diameter and defined into a circular shape or ring. The ring shape of the inner spring coil 24 can include a gap or split 241 so that the diameter of the ring can flex during assembly. The inner spring coil 24 can be made from steel or any other suitable material and have a finish of nickel, chrome, or any other suitable material.

The rubber ring 25 can be an O-ring made from nitrile butadiene rubber (NBR). In the connector 20, the rubber ring 25 can be located in the recessed groove 235 of the intermediate connection to provide an environmental seal within the connector 20.

Figure 14:
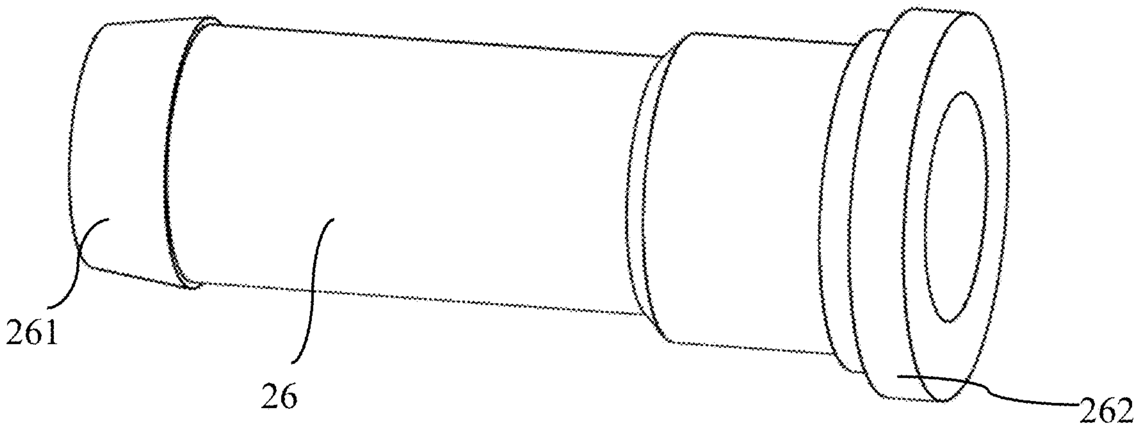
FIG. 14 is a perspective view of an in-connection.

FIG. 14 is a perspective view of the in-connection 26. The in-connection 26 can be substantially cylindrical and includes portions with various outer diameters with a bore of one inner diameter therethrough. A first portion 261 of the in-connection 26 can include a stepped up outer diameter that tapers to a reduced outer diameter toward the end. A second portion 262 can include a flange to fit within the nut 29 as shown in FIG. 7. The in-connection 26 can be made from copper, brass, or any suitable metal or alloy and have a finish of nickel, chrome, or any other suitable material.

Figure 15:
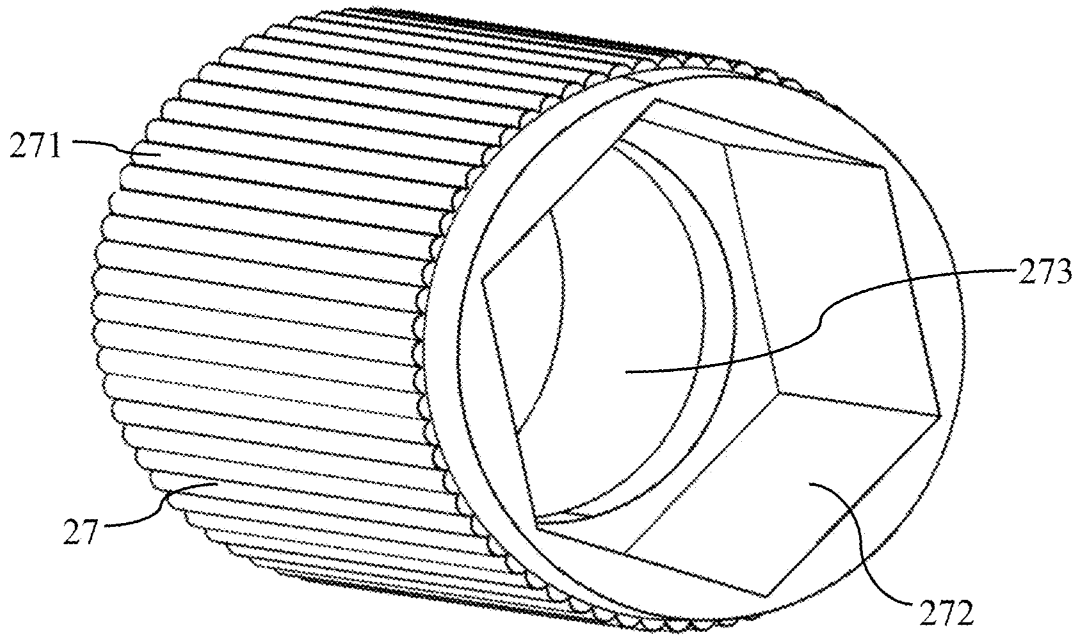
FIG. 15 is a perspective view of an outer shell.

FIG. 15 is a perspective view of the outer shell 27. The outer shell 27 can be substantially cylindrical and include a knurled pattern 271 on the outer surface. As shown, the knurled pattern can be a series of straight ridges or another suitable pattern to permit a user's fingers to get a better grip on the connector 20 than would be provided by a smooth surface. The interior of the outer shell 27 can include a first portion 272 that has a cut out dimensioned to match with the outer pattern of the nut 29. The cut out can be hexagonal. A second portion 273 can have a smooth bore. The outer shell 27 can be made from polyoxymethylene (POM), nylon, or any suitable plastic or material. The outer shell 27 can be black or any suitable color. The outer shell 27 can be made by injection molding.

Figure 16:
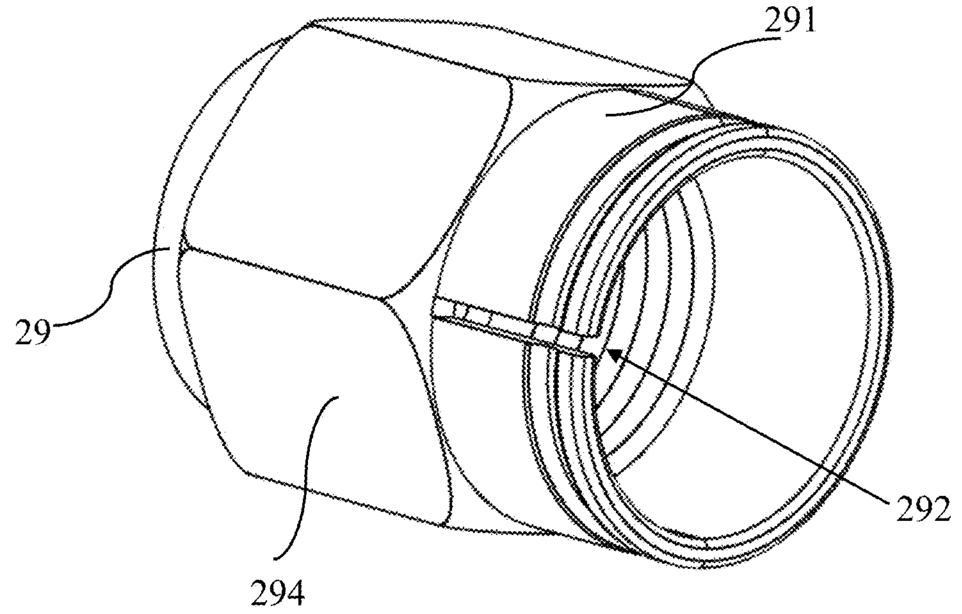
FIG. 16 is a front perspective view of a nut.
Figure 17:
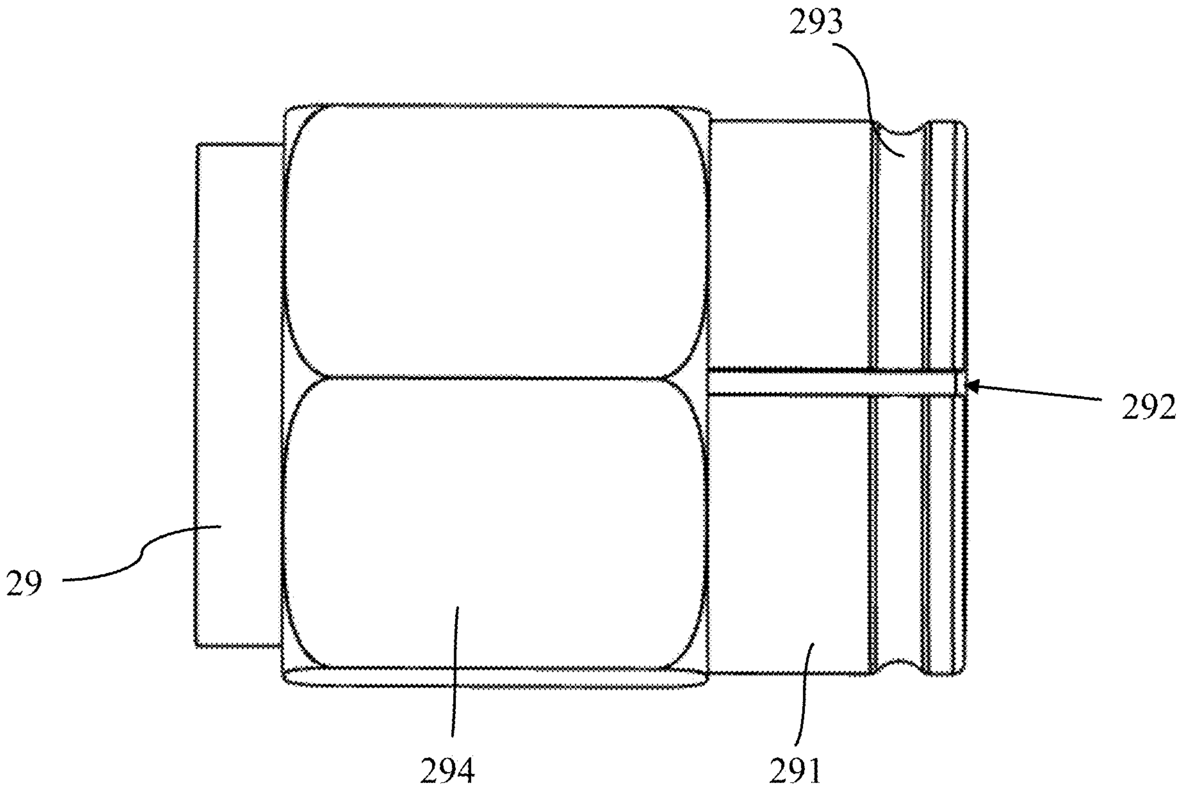
FIG. 17 is a side view of the nut.
Figure 18:
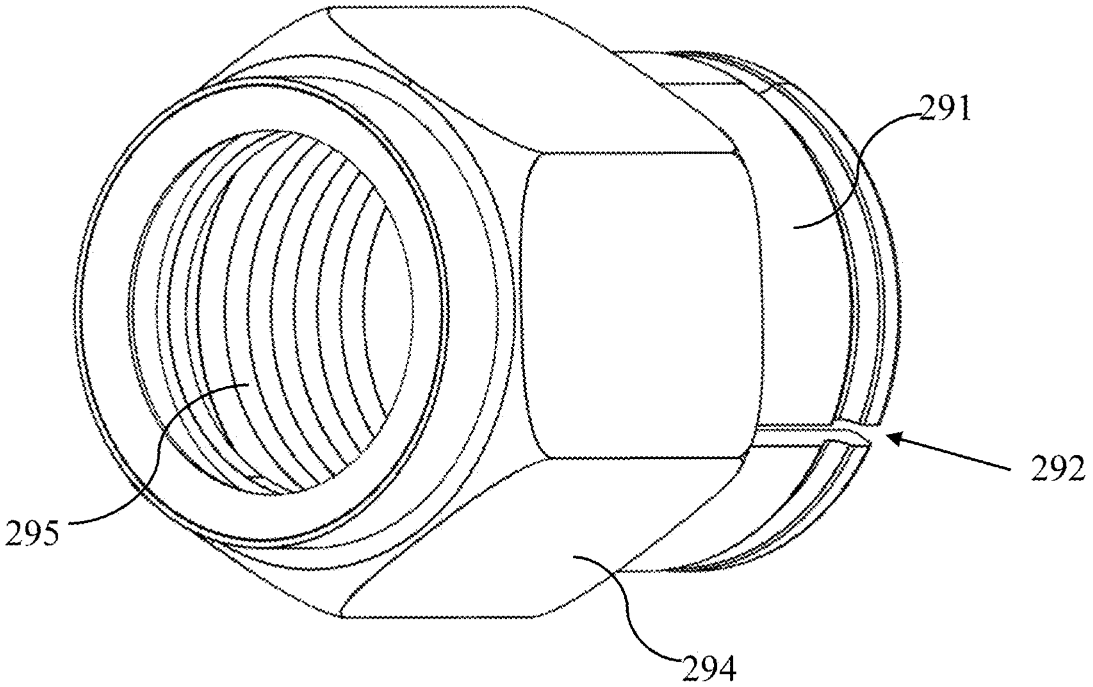
FIG. 18 is a rear perspective view of the nut.
Figure 19:
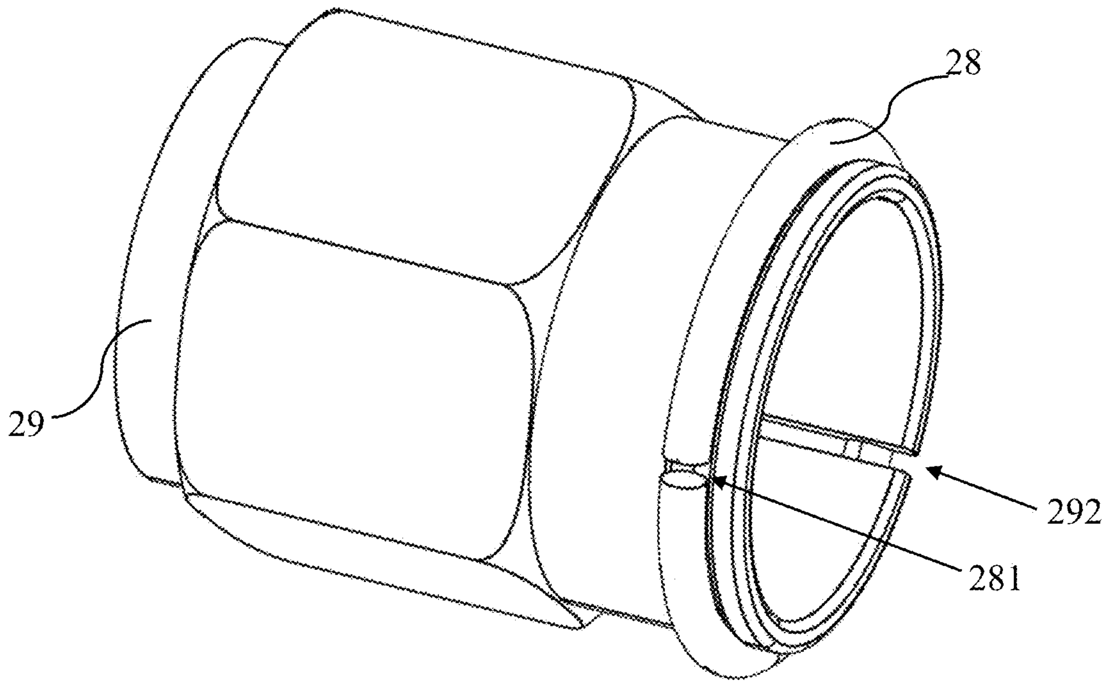
FIG. 19 is a perspective view of the nut and an outer spring coil.

FIG. 16 is a front perspective view, FIG. 17 is a side view, and FIG. 18 is a rear perspective view of the nut 29. The nut 29 can include a "C" shaped sleeve portion 291 and a screw portion 294. The sleeve portion 291 can be substantially cylindrical and include a bore, a longitudinal slot 292 (defining the opening of the "C" shape), and a circumferential recess 293. The sleeve portion 291 provides a press-on section that operates by a friction fit to a female connector or RF port while also aligning the connector axis of connector 20 to the female connector. The surface of the bore of the sleeve portion 291 can have a roughened texture to increase friction to the female connector. The sleeve portion 291 can include an angled, tapered, or beveled leading edge to guide alignment of the connector 20 to the female connector as the connector 20 is being pressed on. The slot 292 allows the diameter of the sleeve portion 291 to be slightly expanded when the sleeve portion 291 is pressed to the female connector. The recess 293 provides a location to fit the outer spring coil 28, as shown in FIG. 19.

When the connector 20 is assembled onto a coaxial cable, the nut is configured to rotate with respect to a reminder of the connector 20. The screw portion 294 can include six flat outer surfaces and internal threads 295. The flat outer surfaces engage with the cut out of the outer shell 27 so that rotating the outer shell 27 also respectively cooperates with and rotates the nut 29. Once the sleeve portion 291 has been pressed onto the female connector to define an initial connection, a user can rotate the outer shell 27 to engage and thread the internal threads 295 of the nut 29 to provide firm mechanical engagement and RF sealing with mating threads of the female connector. In an embodiment, the internal threads 295 of the nut 29 can provide for six full turns of engagement to the female connector. The nut 29 can be machined and made from copper, brass, or any suitable metal or alloy and have a finish of nickel, chrome, or any other suitable material such that the nut 29 provides good ground connectivity and environmental sealing between the connector 20 and the female connector.

The outer spring coil 28 can be shaped similar to the inner spring coil 24, although sized differently. The outer spring coil 28 can be rounded with a uniform diameter and defined into a circular shape or ring. The diameter and the ring size of the outer spring coil 28 can be different that those of the inner spring coil 24. The ring shape of the outer spring coil 28 can include a gap or split 281 such that the diameter of the ring can flex during assembly and assist in providing a spring force to the sleeve portion 291. The outer spring coil 28 can be made from steel or any other suitable material and have a finish of nickel, chrome, or any other suitable material.

In using the hybrid connector 20, with one hand a user can push or press the connector 20 onto the female RF connector causing the sleeve portion 291 to engage the female connector with a friction inference fit and longitudinally align the two connectors. Such alignment makes it easy for the user to engage the threads 295 of the nut 29 to the threaded portion of the female connector. Without the need for tools, the user can rotate the outer shell 27 with multiple turns to draw the connector 20 and the female connector together with an adequate torque without over-tightening to complete a robust electrical and environmental connection.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A connector for a coaxial cable comprising: a nut including a sleeve portion and a threaded portion; and a spring coil substantially surrounding the sleeve portion.

2. The connector of claim 1, further comprising a cable connecting portion configured to connect the connector to the coaxial cable.

3. The connector of claim 2, wherein a rear portion of the nut is configured to connect to the cable connecting portion.

4. The connector of claim 1, further comprising an outer shell around the nut that includes a knurled portion on an outer surface.

5. The connector of claim 1, wherein the sleeve portion is a front end of the nut.

6. The connector of claim 1, wherein the sleeve portion includes only one longitudinal slot.

7. The connector of claim 1, wherein the sleeve portion includes a smooth portion on an inside of the nut.

8. The connector of claim 1, wherein the sleeve portion is configured to provide an interference fit to a mating connector.

9. The connector of claim 1, wherein, when the nut is connected to a mating connector, both the sleeve portion and the threaded portion make electrical and physical contact with the mating connector.

10. The connector of claim 1, wherein the sleeve portion includes a circumferential recess and the spring coil is located in the recess.

11. The connector of claim 1, wherein the threaded portion includes threads configured to engage threads of a mating connector.

12. The connector of claim 1, wherein the connector is an F-type connector.

13. A connector for a coaxial cable comprising a nut including a sleeve portion and a threaded portion, wherein the sleeve portion includes only one longitudinal slot.

14. The connector of claim 13, wherein the sleeve portion includes a recess substantially surrounding a circumference.

15. The connector of claim 14, further comprising a spring coil located in the recess.

16. The connector of claim 13, wherein when the nut is connected to a mating connector, both the sleeve portion and the threaded portion make electrical and physical contact with the mating connector.

17. The connector of claim 13, further comprising an outer shell around the nut.

18. The connector of claim 17, wherein the outer shell includes a knurled portion on an outer surface.

19. The connector of claim 13, wherein the connector is an F-type connector.

20. A connector for a coaxial cable comprising:

a nut including a sleeve portion including a smooth portion on an inside of the nut and only one longitudinal slot, and a threaded portion;

a spring coil substantially surrounding the sleeve portion; and an outer shell around the nut, wherein the sleeve portion is configured to provide an interference fit to a mating connector, when the nut is connected to the mating connector, both the sleeve portion and the threaded portion make electrical and physical contact with the mating connector, the outer shell includes a knurled portion on an outer surface, the sleeve portion includes a circumferential recess and the spring coil is located in the recess, and a rear portion of the nut is configured to connect to the cable connecting portion.

* * * * *